United States Patent
Giaier et al.

(10) Patent No.: US 9,452,657 B1
(45) Date of Patent: Sep. 27, 2016

(54) HEIGHT DETERMINATION FOR TWO INDEPENDENTLY SUSPENDED WHEELS USING A HEIGHT SENSOR FOR ONLY ONE WHEEL

(71) Applicant: FORD GLOBAL TECHNOLOGIES, LLC, Dearborn, MI (US)

(72) Inventors: Kevin S. Giaier, Clarkston, MI (US); Edmund S. Anderson, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/978,098

(22) Filed: Dec. 22, 2015

(51) Int. Cl.
  *B60G 17/019* (2006.01)
  *B60G 17/0195* (2006.01)
  *B60G 21/055* (2006.01)
  *B60Q 1/08* (2006.01)
  *B60Q 1/10* (2006.01)

(52) U.S. Cl.
  CPC ... *B60G 17/01941* (2013.01); *B60G 17/01908* (2013.01); *B60G 21/055* (2013.01); *B60Q 1/08* (2013.01); *B60Q 1/10* (2013.01); *B60G 2400/252* (2013.01); *B60G 2401/12* (2013.01); *B60G 2500/30* (2013.01); *B60Q 2300/136* (2013.01)

(58) Field of Classification Search
  CPC .......... B60G 2401/12; B60G 2401/122; B60G 17/019; B60G 17/01908; B60G 17/01941; B60G 17/0195; B60G 21/005; B60G 21/055; B60G 21/0553; B60G 21/0555; B60G 21/0558; B60G 2204/116; B60G 2204/1162; B60G 2400/252; B60G 2400/94; B60G 2400/98; B60G 2500/30; B60G 2800/012; B60G 2800/70; B60G 2800/91; B60G 2800/912; B60G 2800/9122; B60G 2800/914; B60G 2800/915; B60Q 2300/136; B60Q 1/08; B60Q 1/10; B60Q 1/115

See application file for complete search history.

(56) References Cited

U.S. PATENT DOCUMENTS

| | | | | |
|---|---|---|---|---|
| 4,078,224 A | * | 3/1978 | Mize | B60G 17/0185 340/440 |
| 4,478,091 A | * | 10/1984 | Forrester | B60G 11/12 177/136 |
| 4,483,546 A | | 11/1984 | Brearley | |
| 4,620,267 A | * | 10/1986 | Cibie | B60Q 1/0023 362/466 |
| 4,770,438 A | | 9/1988 | Sugasawa et al. | |
| 4,836,578 A | | 6/1989 | Soltis | |

(Continued)

FOREIGN PATENT DOCUMENTS

| | | |
|---|---|---|
| CN | 102506975 B | 6/2012 |
| EP | 0323094 B1 | 10/1993 |

(Continued)

*Primary Examiner* — Laura Freedman
(74) *Attorney, Agent, or Firm* — Raymond L. Coppiellie

(57) ABSTRACT

Ride height for use in an adaptive suspension damping system, tiltable headlamp systems, or other systems is determined for first and second wheels which are mounted to first and second suspensions having first and second control arms coupled between the respective wheels and a frame of the vehicle. An anti-roll system is coupled between the control arms. A mechanical height sensor is coupled to the first wheel to directly sense a first height associated with the first wheel. A strain sensor is coupled to the anti-roll system to generate a strain signal in response to a strain in the anti-roll system. A controller converts the strain signal to a second height associated with the second wheel. Thus, ride heights for both wheels on opposite sides of the vehicle are obtained using only one direct height measurement.

17 Claims, 5 Drawing Sheets

(56) References Cited

U.S. PATENT DOCUMENTS

| | | | | |
|---|---|---|---|---|
| 4,997,202 A * | 3/1991 | Kitagawa | B60G 11/08 | |
| | | | 267/31 | |
| 5,058,918 A * | 10/1991 | Nakaya | B60G 11/08 | |
| | | | 280/124.136 | |
| 5,127,277 A * | 7/1992 | Forrester | G01G 19/08 | |
| | | | 73/862.541 | |
| 5,229,955 A * | 7/1993 | Nishiwaki | B60G 17/0182 | |
| | | | 180/415 | |
| 5,242,190 A | 9/1993 | Morris | | |
| 5,794,168 A | 8/1998 | Sasaki et al. | | |
| 5,847,290 A | 12/1998 | Kim | | |
| 5,877,680 A * | 3/1999 | Okuchi | B60Q 1/115 | |
| | | | 315/82 | |
| 5,923,125 A * | 7/1999 | Endo | B60Q 1/00 | |
| | | | 15/250.002 | |
| 5,962,980 A * | 10/1999 | Kluge | B60Q 1/115 | |
| | | | 307/10.8 | |
| 6,183,118 B1 * | 2/2001 | Toda | B60Q 1/115 | |
| | | | 315/360 | |
| 6,193,398 B1 * | 2/2001 | Okuchi | B60Q 1/115 | |
| | | | 362/276 | |
| 6,229,263 B1 * | 5/2001 | Izawa | B60Q 1/115 | |
| | | | 315/80 | |
| 6,234,654 B1 * | 5/2001 | Okuchi | B60Q 1/10 | |
| | | | 362/276 | |
| 6,278,912 B1 * | 8/2001 | Amano | B60G 17/01908 | |
| | | | 280/5.507 | |
| 6,366,024 B1 * | 4/2002 | Jonner | B60Q 1/115 | |
| | | | 307/10.8 | |
| 6,389,344 B1 * | 5/2002 | Nishimura | B60Q 1/115 | |
| | | | 315/82 | |
| 6,450,673 B1 * | 9/2002 | Toda | B60Q 1/115 | |
| | | | 362/464 | |
| 6,663,268 B1 * | 12/2003 | Toda | B60Q 1/115 | |
| | | | 362/271 | |
| 6,991,239 B2 * | 1/2006 | Schutt | B60G 17/0155 | |
| | | | 280/124.116 | |
| 7,233,237 B2 | 6/2007 | Dufournier | | |
| 7,354,048 B2 * | 4/2008 | Suzuki | B60G 17/0162 | |
| | | | 280/124.106 | |
| 7,540,505 B2 * | 6/2009 | Ogawa | B60G 17/0162 | |
| | | | 280/124.152 | |
| 7,572,040 B2 * | 8/2009 | Okura | B60Q 1/115 | |
| | | | 362/465 | |
| 7,706,942 B2 * | 4/2010 | Miyajima | B60G 17/019 | |
| | | | 280/5.507 | |
| 8,346,433 B2 * | 1/2013 | Lu | B60T 8/17554 | |
| | | | 280/5.506 | |
| 8,392,073 B2 * | 3/2013 | Kitajima | B60Q 1/115 | |
| | | | 362/460 | |
| 8,996,249 B2 | 3/2015 | Lu et al. | | |

FOREIGN PATENT DOCUMENTS

| | | | |
|---|---|---|---|
| EP | 1612061 A1 | | 4/2006 |
| JP | 09226336 A | | 9/1997 |
| JP | 2000198434 A | * | 7/2000 |
| JP | 2006321382 A | * | 11/2006 |
| KR | 20020055817 A | | 7/2002 |
| WO | 9424534 | | 10/1994 |

* cited by examiner

HEIGHT DETERMINATION FOR TWO INDEPENDENTLY SUSPENDED WHEELS USING A HEIGHT SENSOR FOR ONLY ONE WHEEL

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to automotive suspension systems, and, more specifically, to determining ride height for a pair of wheels that are coupled by an anti-roll system.

Automotive suspension systems may include one or more sensors for detecting the relative position of one or more portions of the suspension with respect to the fixed frame (e.g., chassis or unibody) of the vehicle. A relative displacement obtained from the sensors provides a "ride height" that may be used by several different types of adaptive systems.

In Continuously Controlled Damping (CCD) systems, for example, a ride height position sensor is used on each wheel to determine its instantaneous position and rate of movement. Variable dampers are controlled to improve ride characteristics in response to the sensor signals.

In the case of vehicles using load leveling or air suspension systems, it is necessary to know the ride height of the vehicle in order to determine whether correction of the ride height is required. When the ride height is lower than a prescribed "trim" limit, an adjustable suspension unit may be given a command to increase ride height. Conversely, in the event that the ride height exceeds the prescribed "trim" limit, the adjustable suspension unit may be given a command to lower, or decrease, the ride height.

Adaptive headlamp systems employ adjustable headlamps that can be aimed to maintain a desired angle with respect to the road ahead even when the vehicle tilts or rocks. Thus, ride height differences between the left and right sides or the front and back of the vehicle are measured in order to determine a correction to the aiming of the headlamps that keeps the light beams pointed as desired.

Most vehicles utilize independent suspensions for each of the wheels. Therefore, ride height has typically been determined using mechanical sensors that directly measure the height of every wheel. Potentiometers, optical encoders, and other displacement sensors are used. The sensors and associated hardware such as fasteners and brackets can be difficult to fit into available spaces. Since a typical vehicle requires ride height sensors at all four wheels, the costs for the parts, assembly, and servicing for the sensors can be significant. It would be desirable to reduce the costs and packaging space requirements for ride height sensing.

SUMMARY OF THE INVENTION

The invention determines ride height for two paired wheels using only one direct, mechanical height sensor at one of the wheels. The second height sensor that was required in the prior art is replaced with a strain gauge mounted to an anti-roll system coupled between the paired wheels. The strain gauge can be implemented at significantly lower cost, occupies less space, and allows freedom of placement at many different locations along the anti-roll system.

In one aspect of the invention, a vehicle comprises first and second wheels and first and second suspensions including first and second control arms coupled between the respective wheels and a frame of the vehicle. An anti-roll system is coupled between the control arms. A height sensor is coupled to the first wheel which senses a first height associated with the first wheel. A strain sensor is coupled to the anti-roll system generating a strain signal in response to a strain in the anti-roll system. A controller converts the strain signal to a second height associated with the second wheel. Thus, ride heights for both wheels on opposite sides of the vehicle are obtained using only one direct height measurement.

DETAILED DESCRIPTION OF PREFERRED EMBODIMENTS

Figure 1:
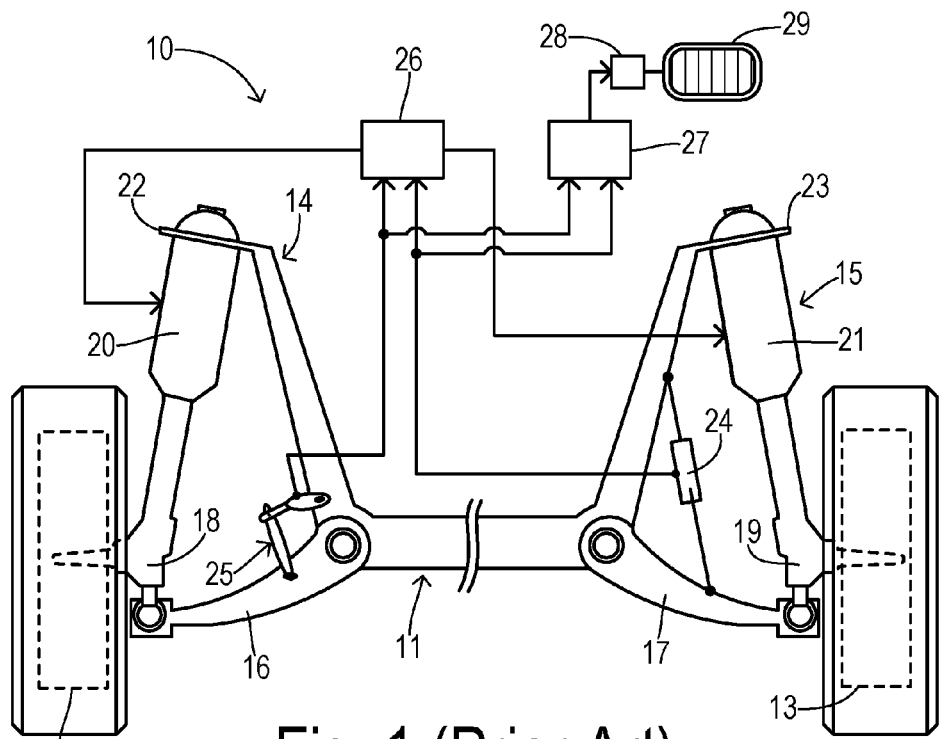
FIG. 1 is a diagram showing a pair of wheels and a suspension system in vehicle with adaptive damping and an adaptive headlamp system.

Referring to FIG. 1, a vehicle 10 includes a frame 11 which may have a chassis construction or a unibody construction. A pair of wheels 12 and 13 may be either the front wheels or the rear wheels of a vehicle, and are suspended by independent suspensions 14 and 15, respectively. The suspensions include control arms 16 and 17 pivotally mounted to the frame 11 at one end and supporting wheel knuckles 18 and 19 at the opposite ends. Adaptive dampeners 20 and 21 are mounted between each arm and upper frame mounts 22 and 23.

FIG. 1 shows two different examples of ride height sensors which can be used to directly measure the ride height (a vehicle would typically utilize the same type of height sensor for each of the paired wheels). A first ride height sensor 24 connected between control arm 17 and frame 11 is a linearly-displaced position sensor. A second ride height sensor 25 coupled between control arm 16 and frame 11 includes pivot arms wherein the angle between pivot arms follows the up and down displacement of wheel 12, and wherein an encoder such as a potentiometer generates a sensor signal proportional to the ride height. Other types of direct height measurements can also be used as known in the art.

The two height signals from sensors 24 and 25 are coupled to a controller 26 for an adaptive damping system. Controller 26 is coupled to adaptive dampeners 20 and 21 for adjusting the damping characteristics as known in the art. The first and second heights signals are also shown coupled to an adaptive headlamp controller 27 which drives an actuator 28 for adaptively aiming a headlamp 29 according to the ride height.

Figure 2:
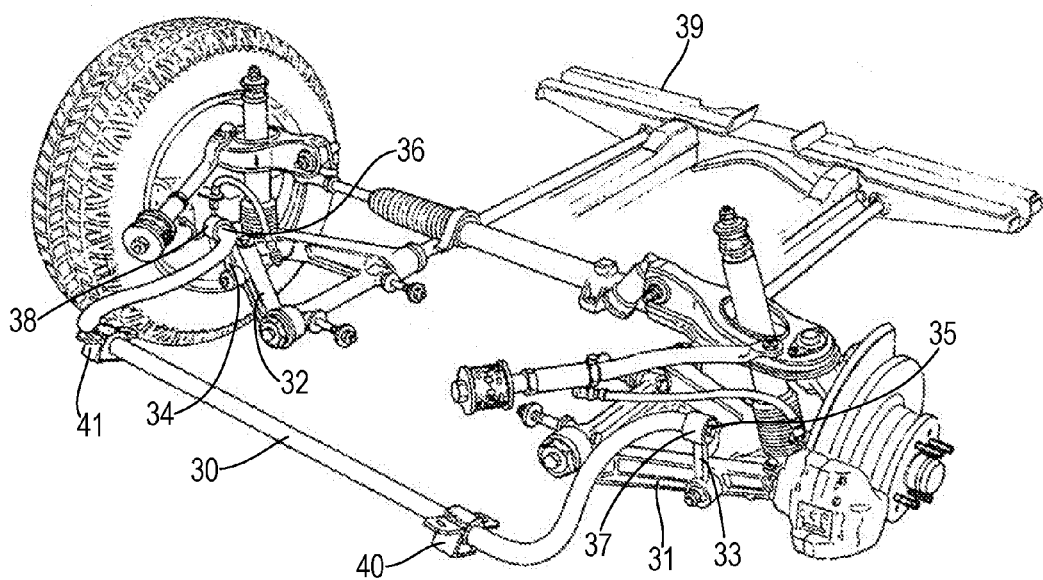
FIG. 2 is a perspective view of a pair of wheels and a suspension system with an anti-roll system.

An anti-roll system is typically used in connection with independent suspensions in order to keep the vehicle from leaning excessively in sharp turns. The main component of such a system is an anti-roll bar (also commonly referred to as a stabilizer bar or sway bar) which is typically fastened between the control arms via connecting links (i.e., end links) which may include ball joints. The bar is also connected to the vehicle frame via bushings. As shown in FIG. 2, a stabilizer bar 30 is coupled between control arms 31 and 32. End links 33 and 34 are connected between opposite ends 35 and 36 of stabilizer bar 30 via respective bushings 37 and 38. A frame 39 is partially shown. Bushings 40 and 41 connect stabilizer bar 30 to frame 39. When a vehicle rounds a corner, a centrifugal or cornering force acts on the vehicle center of gravity towards the center of instantaneous rotation. The center of gravity of a vehicle is located above the contact plane or where the tires contact the road. This creates a weight transfer between the wheels on the inside of the vehicle during a cornering event to the outside of the vehicle. Stabilizer bar 30 reflects some of this transferred force on the outboard wheels of the vehicle back to the inboard wheels with its resistance to twisting. This ultimately limits body roll during a cornering event.

Figure 3:
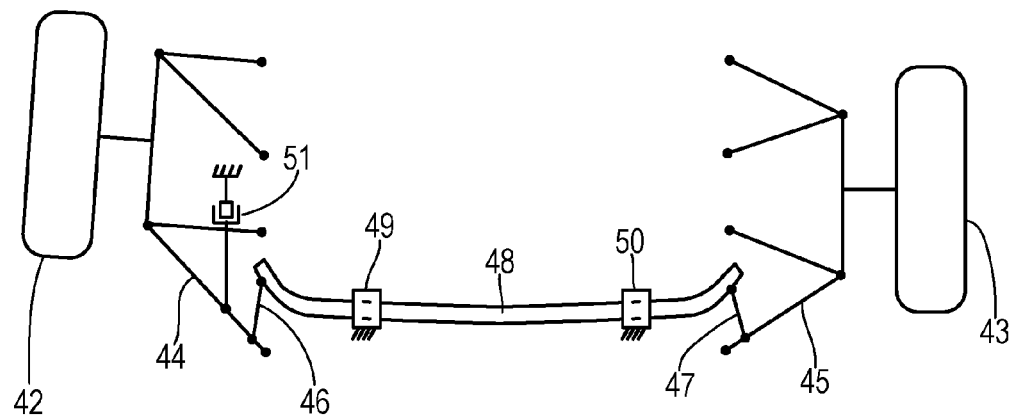
FIG. 3 is a diagram showing force interactions within an anti-roll system.

FIG. 3 is a schematic representation of suspension movement wherein a first wheel 42 is in jounce (opposite of rebound) and a wheel 43 is undeflected. A control arm 44 connected to wheel 42 is deflected upward while a control arm 45 supporting wheel 43 is at its nominal height. By virtue of the connection of end links 46 and 47 between control arms 44 and 45 and the opposite ends of an anti-roll bar 48 (which is fixed via bushings 49 and 50 to the vehicle frame), the difference in the ride height between wheels 42 and 43 creates a force across the anti-roll system that manifests as a torsion in bar 48 and a tension or compression in end links 46 and 47. The force is proportional to the height difference and can be measured as a strain at any convenient spot within the anti-roll system. A displacement sensor 51 is shown between control arm 44 and a fixed portion of the vehicle frame for directly determining a ride height of wheel 42. In the present invention, no direct measurement of the ride height for wheel 43 is necessary because that height can be inferred using the strain.

Figure 4:
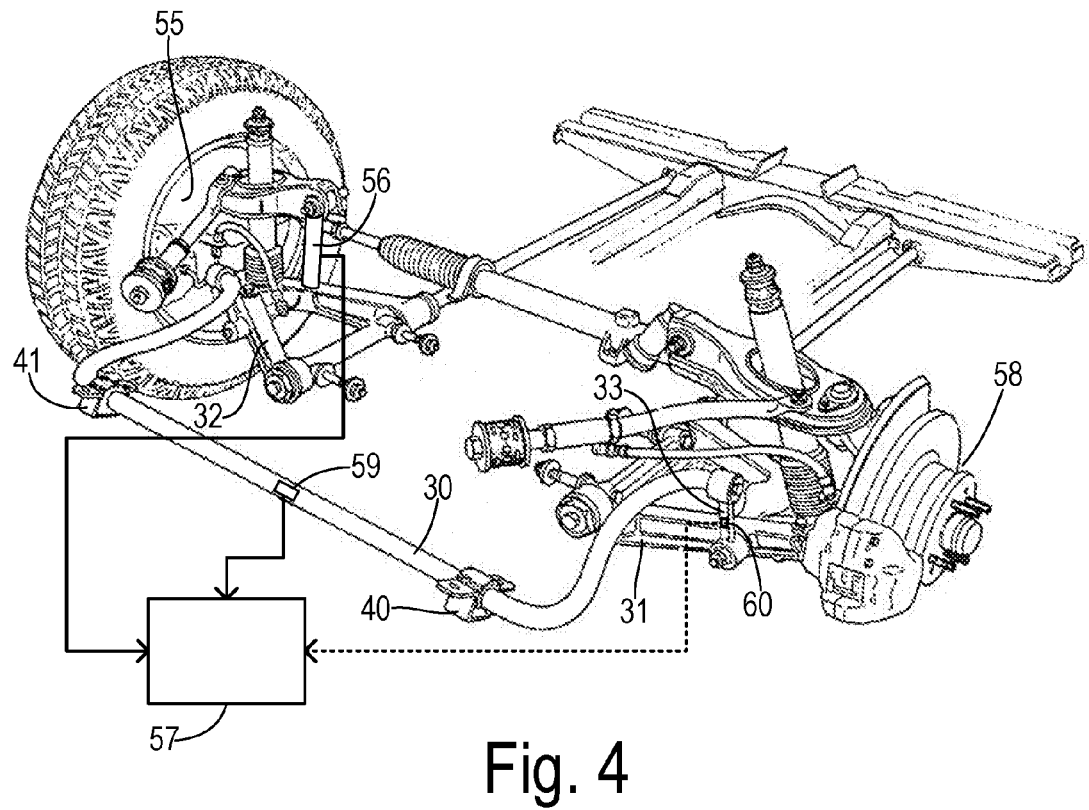
FIG. 4 is a perspective view and block diagram of an embodiment of the invention combining a direct height measurement of one wheel with an inferred measurement of the height of the other wheel based on strain within the anti-roll system.

As shown in FIG. 4, the height of a first wheel 55 is directly measured by a first height sensor 56 and the resulting height signal is coupled to a controller 57. For inferring a ride height of a second wheel 58, a strain sensor (or strain gauge) 59 is mounted on bar 30 with a resulting strain signal being coupled to controller 57. Controller 57 converts the strain signal to a second height for the second wheel using the first height obtained from sensor 56. FIG. 4 also shows an alternative placement of a strain sensor 60 on end link 33.

Figure 5:
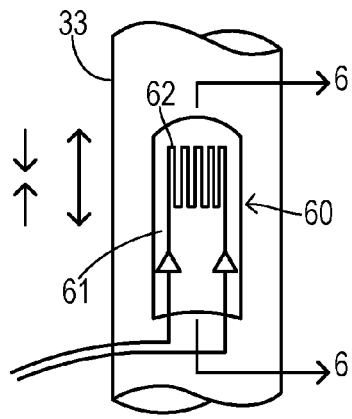
FIG. 5 is a plan view showing a strain gauge mounted to a surface of an end link of an anti-roll system.
Figure 6:
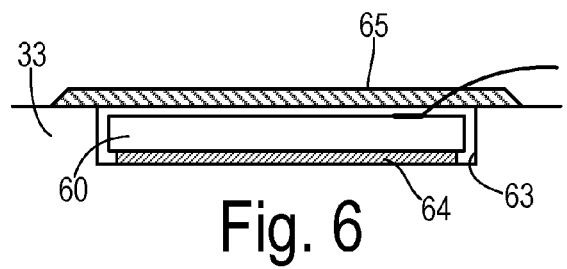
FIG. 6 is a cross section along lines 6-6 of FIG. 5 showing on embodiment of attaching the strain gauge.

Strain sensors or strain gauges are well-known devices for measuring strain in a material. Many sensors and detection circuits are commercially available which are optimized for determining strain in both torsion or tension modes. FIG. 5 shows an example of strain sensor 60 mounted on end link 33 in greater detail. A substrate 61 carrying a conductive foil path 62 is stretched or compressed by strain within link 33, which changes the resistance of path 62 which are then identified using a detector circuit such as a Wheatstone bridge. Strain gauge 60 may be bonded directly to a surface of end link 33 by an adhesive and then covered by a waterproof protective layer. End link 33 may also include a recess 63 sunk into link 33 for receiving strain gauge 60. An adhesive bonding material 64 transmits strain from link 33 into sensor 60. Bond 64 should be thin and rigid in order to transfer the strain effectively. A hot or cold cure adhesive can be used. A protective coating 65 applied over strain gauge 60 may be a curable waterproof material such as a polyurethane varnish, nitrile rubber, or silicone.

Figure 7:
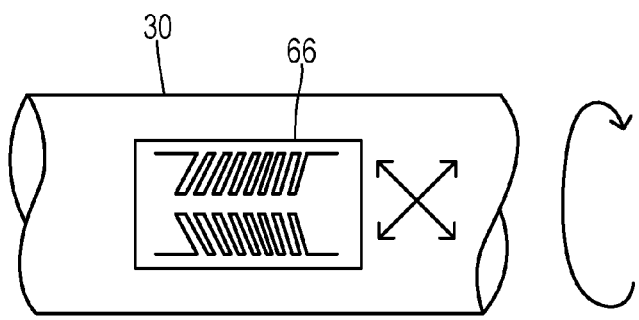
FIG. 7 is a plan view showing a strain gauge mounted to a surface of an anti-roll (i.e., stabilizer) bar.

FIG. 7 shows a dual-axis strain gauge 66 applied to stabilizer bar 30 having a configuration adapted to sense torsion or twisting in bar 30. Strain gauge 66 has two sections slanted in opposite directions for sensing both the amount and direction of torsion as known in the art. The dual axes are indicated by crossed arrows.

Figure 8:
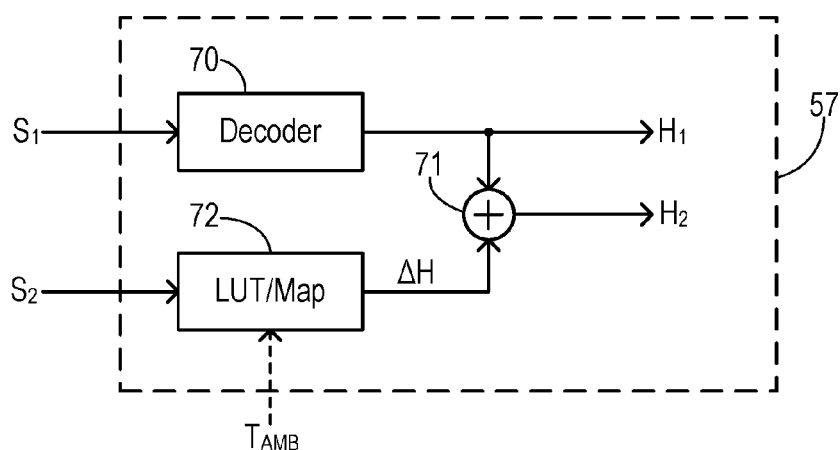
FIG. 8 is a block diagram showing one embodiment of a controller for determining ride height according to the present invention.

FIG. 8 shows a first embodiment of controller 57 in greater detail. A first sensor signal $S_1$ from the height sensor which directly senses the first wheel height is coupled to a decoder 70 (if necessary) to provide a value (e.g., digital value) for the first height $H_1$. The value for height $H_1$ is output for use by an adaptive system and is also coupled to one input of a summer or adder 71. A strain signal $S_2$ from the strain sensor is coupled to the input of a lookup table (LUT) or map 72 which correlates strain signal $S_2$ to a height difference $\Delta H$ between the first and second wheels. The height difference $\Delta H$ is coupled to a second input of summer 71 to generate a value for the second ride height H2. ARB components do not heat to a great degree during operation. Therefore ambient temperature can be a fairly accurate representation of the component temperature.

Strain gauges and detector circuits are known that provide inherent temperature compensation. In the event that uncompensated temperature effects are nevertheless present in the strain signal, LUT 72 can be generated over a range of temperatures. Then an ambient temperature TAMS can be measured and used as an index into LUT 72 when retrieving height difference ΔH.

Figure 9:
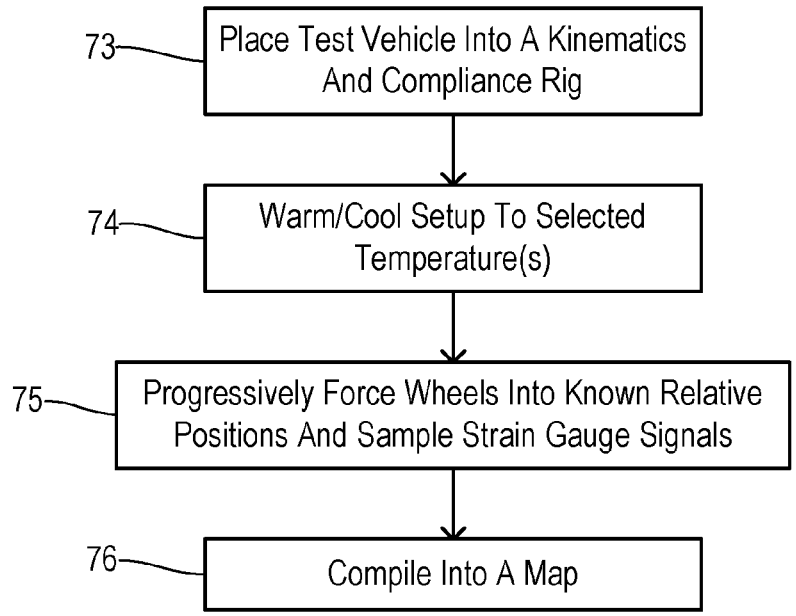
FIG. 9 is a flowchart showing one preferred method for configuring the map of FIG. 8.

A method for generating the contents of lookup table 72 is shown in FIG. 9. In step 73, a test vehicle (e.g. prototype) having a specific configuration of the suspension system, anti-roll system, and strain sensor is placed into a kinematics and compliance rig which is capable of manipulating the ride heights of the wheels on the test vehicle. In step 74, the test set-up may optionally be warmed or cooled to selected temperatures dispersed over a desired operating range (i.e., if necessary to maintain sufficient accuracy in the height ride height characterization). In step 75, the rig progressively forces the wheels into known relative positions at each of the selected temperatures, and the corresponding strain gauge signals are sampled and recorded for the various height differences. In step 76, the height differences, temperature values, and strain gauge signals are compiled as a mapping into the lookup table for use in production vehicles having the specified vehicle design.

Figure 10:
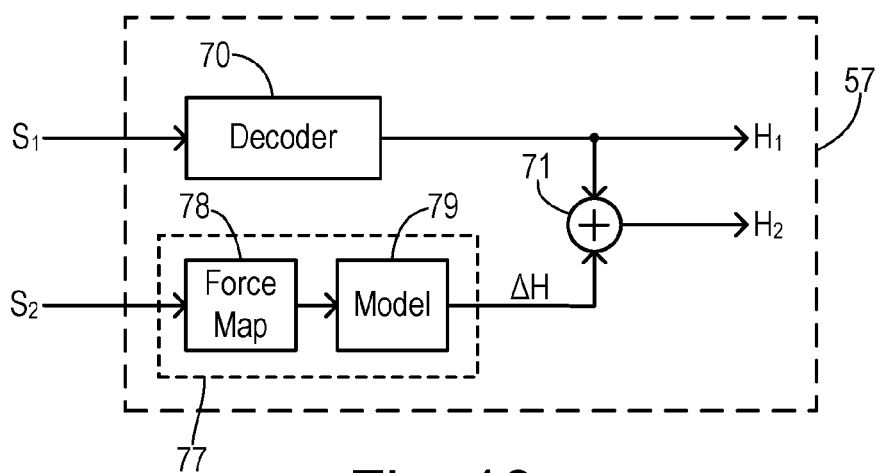
FIG. 10 is a block diagram showing another embodiment of a controller for determining ride height according to the present invention.

FIG. 10 shows an alternative embodiment of controller 57 wherein the lookup table is instead replaced by a processing block 77 including a force map 78 and a model 79 for converting strain signal $S_2$ into the height difference ΔH. Force map 78 is calibrated to relate a known applied force (such as torsion applied to the anti-roll bar or tension applied to the end links) and the resulting strain that would occur, which can be determined by measurement in a test rig or based on CAE analysis. In operation, map 78 is used in controller 57 to convert a measured strain to the applied force. The derived force from map 78 is provided to a kinematic model 79 which models the suspension system and anti-roll system. Model 79 may be derived during the development of a particular vehicle design using CAE analysis, for example. The resulting height difference ΔH is applied to summer 71 in the same manner as described in the previous embodiment.

Figure 11:
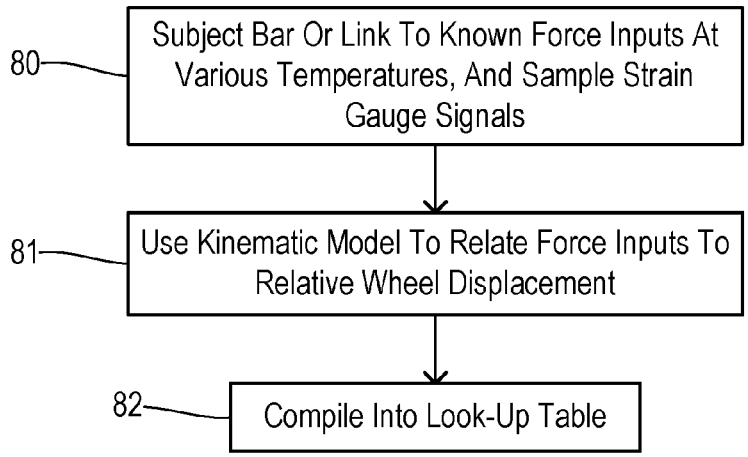
FIG. 11 is a flowchart showing one preferred method for configuring the controller of FIG. 10.

FIG. 11 shows one embodiment of a method for combining force map 78 and model 79 into a single lookup table to implement processing block 77. In step 80, the anti-roll bar or the end link which will carry the strain gauge is subjected to known force inputs at various temperatures and then the strain gauge signals are accordingly sampled. In step 81, the empirical kinematic model is used to relate the force inputs to corresponding relative wheel displacements, and the corresponding correlation between different strain gauge signals and the corresponding height differences are compiled into a lookup table in step 82.

Figure 12:
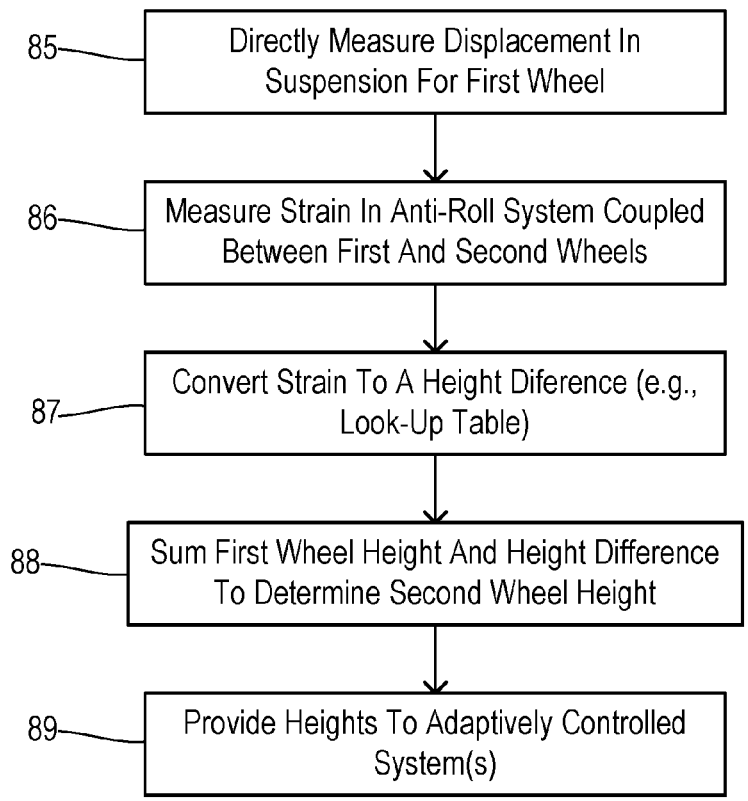
FIG. 12 is a flowchart showing one preferred method of determining ride height for a pair of wheels during vehicle operation.

Real-time operation of the invention on a vehicle is shown in FIG. 12. In step 85, a displacement within the suspension for a first vehicle first wheel is directly measured. A strain in the anti-roll system coupled between first and second wheels is measured in step 86. In step 87, the strain is converted to a height difference. In step 88, the first wheel height and the height difference are summed to determine the second wheel height. In step 89, the determined heights are provided to adaptively controlled systems such as an adaptive damping system or an adaptive headlamps system.

The foregoing invention is applicable to any pair of wheels (i.e., both the front and rear wheel sets). In summary, a complete position awareness of the left and right wheel in a suspension is be achieved by measuring the position of a wheel mechanically as in a traditional system and then measuring the strain in the anti-roll bar system. One mechanical sensor is mounted to one side of the suspension as in a typical CCD system. This provides complete static and dynamic position information of that wheel. The state of the opposite side of the suspension is measured through strain in the anti-roll bar system.

When one wheel of a suspension system is deflected while the opposing side of the suspension remains un-deflected, the result is torsion in the anti-roll bar and compression/tension in the anti-roll bar connecting links. Mounting a strain gauge within this system (either the anti-roll bar or a connecting link) and calibrating this strain to correspond to the differential deflection between vehicle wheels allows for complete system awareness. When both wheels of the suspension system are deflected (or undeflected) by an identical amount, there will be no strain in the anti-roll bar system. In that case, the measured deflection in the mechanical sensor applies to both wheels. If the wheel without the sensor is deflected alone, there will be measured strain in the anti-roll bar system with no mechanical deflection at the sensor. If the wheel with the mechanical sensor is deflected alone, there will be both measured mechanical deflection at the wheel and measured strain in the anti-roll bar system.

A control system interprets these signals and determines the kinematic state (i.e., position, velocity, and acceleration) of each wheel. This system utilizes appropriate logic to interpret strain within the anti-roll bar and mechanical position of the one wheel to provide awareness of each wheel's position. In total, the invention has the potential to replace two mechanical position sensors with two strain gauges in a four-wheeled vehicle. This has the potential to create significant savings without altering the performance of the adaptive system(s) using the ride height information.

What is claimed is:

1. A vehicle comprising:
   first and second wheels;
   first and second suspensions including first and second control arms coupled between the respective wheels and a frame of the vehicle;
   an anti-roll system coupled between the control arms;
   a height sensor coupled to the first wheel sensing a first height associated with the first wheel;
   a strain sensor coupled to the anti-roll system generating a strain signal in response to a strain in the anti-roll system; and
   a controller converting the strain signal to a second height associated with the second wheel.

2. The vehicle of claim 1 wherein the controller determines a height difference from the strain signal, and determines the second height by summing the first height and the height difference.

3. The vehicle of claim 2 wherein the controller uses a lookup table relating the strain signal to the height difference.

4. The vehicle of claim 2 wherein the controller uses a lookup table relating the strain signal to a force acting on the anti-roll system, and wherein the controller determines the height difference in response to the force.

5. The vehicle of claim 1 wherein the anti-roll system is comprised of an anti-roll bar, and wherein the strain sensor is mounted to the anti-roll bar to respond to torsion.

6. The vehicle of claim 1 wherein the anti-roll system is comprised of an anti-roll bar having an end link connected to a control arm, and wherein the strain sensor is mounted to the end link to respond to compression and tension.

7. The vehicle of claim 1 wherein the strain sensor is mounted to the anti-roll system by an adhesive, and wherein the strain sensor further comprises a protective coating.

8. The vehicle of claim 1 further comprising:
   a continuously controlled damping system coupled to the wheels, wherein the damping system actively varies a damping characteristic in response to the first and second heights.

9. The vehicle of claim 1 further comprising:
   an adaptive headlamp system including tiltable headlamps, wherein the headlamps are aimed in response to the first and second heights.

10. A vehicle comprising:
    two wheels;
    independent suspensions for the wheels including respective control arms;
    a stabilizer system coupled between the control arms;
    a height sensor coupled to one wheel sensing an associated first height;
    a strain sensor coupled to the stabilizer system generating a strain signal in response to a strain in the stabilizer system; and
    a controller converting the strain signal to a second height associated with the other wheel.

11. A method comprising:
directly measuring a first displacement in a suspension for a first wheel on a vehicle;
measuring a strain occurring in an anti-roll system coupled between the first wheel and a second wheel;
converting the strain to a height difference between the first wheel and the second wheel; and
summing the height difference and the first displacement to determine a second displacement for the second wheel.

12. The method of claim 11 further comprising:
adaptively controlling an active damping system coupled to the wheels in response to the first and second displacements.

13. The method of claim 11 further comprising:
adaptively controlling an active headlamp system for aiming at least one headlamp in response to the first and second displacements.

14. The method of claim 11 wherein the step of converting the strain to a height difference is comprised of:
using a strain voltage from a strain detector as an index into a lookup table relating the strain voltage to the height difference.

15. The method of claim 11 wherein the step of converting the strain to a height difference is comprised of:
using a strain voltage from a strain detector as an index into a lookup table relating the strain voltage to a force acting on the anti-roll system; and
determining the height difference in response to the force and a model correlating the force to corresponding height differences.

16. The method of claim 11 wherein the step of measuring a strain occurring in the anti-roll system is comprised of sensing a compression and a tension occurring in a link connecting an anti-roll bar of the anti-roll system to a control arm of the suspension.

17. The method of claim 11 wherein the step of measuring a strain occurring in the anti-roll system is comprised of sensing a torsion occurring in an anti-roll bar of the anti-roll system.

* * * * *